UNITED STATES PATENT OFFICE.

ALEXANDER STRAUS, OF NEW YORK, N. Y.

METHOD OF FORMING SPONGE SUBSTITUTES.

SPECIFICATION forming part of Letters Patent No. 702,162, dated June 10, 1902.

Application filed November 5, 1901. Serial No. 81,258. (No specimens.)

*To all whom it may concern:*

Be it known that I, ALEXANDER STRAUS, a citizen of the United States, residing at New York, in the county and State of New York, have invented new and useful Improvements in Methods of Forming Sponge Substitutes, of which the following is a specification.

This invention relates to a method of forming a sponge substitute; and its main object is to produce a substitute for sponge that is elastic and absorbent and has all the other properties of a natural sponge that are commercially desirable.

The present process of forming a rubber sponge is in the nature of an improvement on that described and claimed in a prior application filed by me September 3, 1901, Serial No. 74,081, in which I have described a method of forming a rubber sponge by using a chemically-acting blowing ingredient, such as bicarbonate of soda, for forming the small cells and a mechanically-acting cell-forming material, such as crushed rock salt, for forming large cells, the rubber compound with which these substances are incorporated being then subjected to heat to form the small cells by chemical action and also to vulcanize the rubber, after which the lumps of rock salt are dissolved out, as by means of hot water. I have found that a sponge substitute or rubber sponge may be perfectly formed in a simpler manner without the use of any mechanically-acting particles for molding large cells, and in the present case both the large and the small cells may be formed by incorporating with rubber, preferably the usual rubber compound or sulfurized rubber, a sufficient quantity of a chemically-acting cell-forming solvent of rubber to partially dissolve the rubber and distend the mass before heating, this substance being also capable of reacting chemically upon the constituent elements of the sulfurized rubber to generate cell-forming gases before vulcanization.

In carrying out the present process I prefer to incorporate with the sulfurized rubber a hydrocarbon capable of partially dissolving the rubber and causing the remainder to be distended as a result of the capillary absorption of the hydrocarbon incorporated with the rubber. Various hydrocarbons may be employed for this purpose; but I have found that those of the petroleum group, particularly the paraffin series, give perfect results.

It is well known that the hydrocarbons just mentioned when combined with rubber react upon the latter in a very peculiar manner, causing one element of the rubber to be practically completely dissolved, while another element of the rubber resists this dissolving action and merely swells up and increases its bulk as the result of the distention of its cells and minute canals or passages by the hydrocarbon drawn thereinto by capillary action. The dissolved element of the rubber when the operation is properly performed leaves cells of considerable size in the rubber compound which correspond to the cells formed by the mechanically-acting particles of rock salt in the process described in my said prior application, while the small cells formed by the distention of the minute natural cells and passages of the rubber correspond to the cells formed by the chemically-acting blowing agent or bicarbonate of soda in said prior process. Thus by combining with the rubber or sulfurized rubber a suitable hydrocarbon, such as paraffin, and subjecting this compound to heat up to the point of vulcanization large cells may be formed by the physical solution of one element of the rubber and small cells formed by capillary absorption of the hydrocarbon and by the blowing of the mass by the gas or gases liberated by the subsequent thermo-chemical action, all of these cells being set when the compound is vulcanized.

In carrying out my present process I usually make use of a rubber compound formed by mixing with crude rubber sufficient sulfur to vulcanize the rubber, after which the hydrocarbon, such as melted paraffin, is incorporated with the sulfurized rubber, the mass being then thoroughly mixed by running it through the rollers of an open mill. Either before or during the passage of the mass through such rollers I may mix therewith sufficient water to fill the minute cells and passages of the natural rubber when absorbed by such capillary cells and passages, the water constituting to a certain extent a substitute for the paraffin, so far as the distention of the natural cells of the rubber is concerned, the water being somewhat rapidly absorbed by these cells and passages, while the paraffin, which is absorbed somewhat slowly, is exerting its dissolving action upon the more soluble portions of the rubber. When the rubber and the paraffin, with or without water, are thoroughly mixed by the rollers of the mill, the resultant mass is partially dissolved and partially undissolved, the capillary cells and passages of the undissolved portions being, however, distended by the absorbed liquid. Material so treated should then be heated to a temperature sufficient to liberate the gases for forming other cells, especially in the dissolved portions of the mass. The nature of the reaction that takes place is complex; but sulfureted hydrogen and probably other gases are liberated and form in the dissolved portions of the rubber innumerable other cells, which still further break up the solid mass to form a structure honeycombed with large and small cells and spaces. When the heat is continued to the point of vulcanization, the vulcanizing action serves to mold the walls of all of the openings around the liquid and gaseous contents thereof into permanent elastic form, the product being an open porous irregular structure having a large number of small to minute cells and passages for receiving water and circulating it therethrough and at the same time having a sufficient number of large openings to honeycomb the structure and leave only thin elastic fibers and connecting portions filled with cells, canals, and larger openings which break up these fibers and connecting portions still further. Hence no long fibers or groups of fibers remain in the interior of the rubber sponge and no long solid masses, all of these fibers and masses being broken up at many points in their lengths, but in an irregular manner, and being elastic in every direction and therefore compressible into a small space, all of these parts returning to their own original positions by their elasticity when the compressing force is removed. Moreover, the small cells, the canals, and the large openings form a network of communicating openings and channels all capable of absorbing water in exactly the same manner as a natural sponge and retaining the water unless the product is squeezed. A sponge substitute formed in this manner possesses substantially all of the characteristics of a natural sponge, is elastic and absorbent to the same extent, is much cheaper than the natural sponge, and is very durable.

Having thus described my invention, I claim—

1. The method of forming a sponge substitute, which consists in incorporating with rubber a sufficient quantity of a chemically-acting cell-forming solvent of rubber to only partially dissolve said rubber, and heating said compound to form cells therein and vulcanize the rubber.

2. The method of forming a sponge substitute, which consists in incorporating with rubber a sufficient quantity of a chemically-acting cell-forming hydrocarbon to only partially dissolve said rubber, and heating said compound to form cells therein and vulcanize the rubber.

3. The method of forming a sponge substitute, which consists in incorporating with rubber a sufficient quantity of paraffin to partially dissolve said rubber, and heating said compound to form cells therein and vulcanize the rubber.

4. The method of forming a sponge substitute, which consists in incorporating with a sulfurized rubber compound a sufficient quantity of a chemically-acting cell-forming hydrocarbon to partially dissolve said rubber, and heating said compound to form cells therein and vulcanize the rubber.

5. The method of forming a sponge substitute, which consists in incorporating with a sulfurized rubber compound a sufficient quantity of a chemically-acting cell-forming hydrocarbon to partially dissolve said rubber, adding a sufficient quantity of water or other liquid to distend the cells of such rubber, and heating said compound to form other cells therein and vulcanize the rubber.

6. The method of forming a sponge substitute, which consists in incorporating paraffin with rubber, and heating said compound to form cells therein and vulcanize the rubber.

7. The method of forming a sponge substitute, which consists in incorporating paraffin and water or other moistening ingredient with rubber, and heating said compound to form cells therein and vulcanize the rubber.

8. The method of forming a sponge substitute, which consists in incorporating with sulfurized rubber a hydrocarbon capable of partially dissolving said rubber and causing a distention of the remainder, and then heating said compound to form cells therein and vulcanize the rubber.

In testimony whereof I have signed my name to this specification, in the presence of two subscribing witnesses, this 29th day of October, 1901.

ALEXANDER STRAUS.

Witnesses:
CHAS. F. DANE,
M. L. FORREST.